(12) United States Patent
Mathews

(10) Patent No.: US 7,120,463 B2
(45) Date of Patent: Oct. 10, 2006

(54) NETWORK INTERFACE CASSETTE ADAPTER AND METHOD

(75) Inventor: David K. Mathews, Fort Worth, TX (US)

(73) Assignee: RadioShack, Corp., Fort Worth, TX (US)

(*) Notice: Subject to any disclaimer, the term of this patent is extended or adjusted under 35 U.S.C. 154(b) by 0 days.

(21) Appl. No.: 11/050,286

(22) Filed: Feb. 3, 2005

(65) Prior Publication Data
US 2005/0266801 A1    Dec. 1, 2005

(51) Int. Cl.
H04B 1/03    (2006.01)
(52) U.S. Cl. .................... 455/557; 455/66.1; 455/344; 369/2; 700/94
(58) Field of Classification Search ............ 455/569.1, 455/557, 66.1, 344, 3.06; 369/2, 11; 700/94
See application file for complete search history.

(56) References Cited

U.S. PATENT DOCUMENTS

| | | | |
|---|---|---|---|
| 3,619,515 A | | 11/1971 | Lace |
| 4,034,164 A | | 7/1977 | Westmoland |
| 4,380,322 A | * | 4/1983 | Yeh .......................... 242/534.2 |
| 4,734,897 A | | 3/1988 | Schotz |
| 5,307,326 A | * | 4/1994 | Osawa ........................... 369/2 |
| 5,654,942 A | * | 8/1997 | Akahane ........................ 369/2 |
| 5,794,138 A | | 8/1998 | Briskman |
| 6,011,756 A | * | 1/2000 | Lee ............................... 369/2 |
| 6,058,319 A | | 5/2000 | Sadler |
| 6,091,672 A | * | 7/2000 | Oh ................................. 369/2 |
| 6,243,686 B1 | * | 6/2001 | McPherson et al. ........ 704/500 |
| 6,301,513 B1 | * | 10/2001 | Divon et al. .................. 700/94 |
| 6,941,180 B1 | * | 9/2005 | Fischer et al. ................ 700/94 |
| 2003/0036407 A1 | * | 2/2003 | Kapoor et al. .............. 455/557 |
| 2003/0088325 A1 | * | 5/2003 | Crutchfield ................... 700/94 |
| 2005/0026559 A1 | * | 2/2005 | Khedouri ................... 455/3.06 |

* cited by examiner

Primary Examiner—Edward F. Urban
Assistant Examiner—Blane J Jackson
(74) Attorney, Agent, or Firm—Dan Brown Law Office; Daniel R. Brown

(57) ABSTRACT

A network interface cassette for coupling signals between a wireless network and a tape head in a cassette tape player. The network interface cassette includes an enclosure that is conformed to the cassette tape form factor. It contains a transceiver that converts base band signals for radio frequency communications within the wireless network. It also contains a network controller that is coupled to communicate the base band signals with the transceiver. The network controller converts digital audio signals to and from the base band signals. There is an audio processor that converts the digital audio signals to analog audio signals. A coupling means converts the analog audio signals to magnetic audio signals. The coupling means is aligned to couple the magnetic audio signals to the tape head. A power supply with batteries incorporates a spindle driven sensor means to control power and function selection within the device. A wireless user interface adapter is provided to couple microphone and audio signals to the apparatus. Plural communications requests are processed, and include a priority scheme to manage resource contention.

29 Claims, 7 Drawing Sheets

NETWORK INTERFACE CASSETTE ADAPTER AND METHOD

BACKGROUND OF THE INVENTION

1. Field of the Invention

The present invention relates electronic audio transmission and reproduction. More specifically, the present invention relates to an apparatus and method for coupling audio content through a wireless network and to a cassette tape player for acoustic reproduction.

2. Description of the Related Art

In the past, users obtained audio content either from receipt of commercial broadcast services or by purchasing prerecorded media. Music and spoken audio content have been continually transmitted by commercial AM and FM broadcast radio stations for many years. Vinyl records were once the dominant form of prerecorded media. Later, 8-track cartridges, cassette tapes, and compact discs became popular forms of distribution for prerecorded audio content media. Mobility during receipt and playback of audio content has always been an important and desirable feature. For example, automotive AM/FM-cassette and CD players have become a standard accessory in modern cars and trucks. Portable radio and cassette players are in common use today as well. In fact, there is a huge installed base of radio receivers and prerecorded media players, such as cassette tape players, in the market today. Virtually all consumers of prerecorded audio content possess some form of high fidelity stereo system.

Recently developed technologies are changing the way that users receive and playback audio content. These technologies include the ubiquitous deployment of personal computing devices, Internet networking, and local area wireless data networks. Today, users are able to download digital audio files from service providers over the Internet and store them in a personal computing device. Systems consisting of a personal computing device and a connected amplifier with loud speakers can then reproduce the digital audio files directly or through interconnection to a conventional high fidelity stereo system. Wire or fiber optic cables have typically interconnected the components of such systems. Portable devices are also available, which can receive compressed audio content data files and reproduce them at a later time. An example of such a device is a portable MP3 audio player, which typically reproduces audio files through a pair of headphones or earphones.

Modern technologies have also enabled other sources for audio content. Such devices include direct broadcast satellite radio receivers, wireless and cellular telephones, GPS receivers, weather radios, digital cameras, video cameras, digital audio recorders, and even personal computing devices, such as personal digital assistants ("PDA") and laptop or palm-top computers. All of these devices have relied upon cables for interconnection and transfer of audio content. However, wireless technologies are now available that enable interconnection of various audio content devices without the use of physical wires and cables.

Wireless interconnectivity is available in a number of configurations. Simple point-to-point systems have been available for some time. Recently, standardized systems and protocols have been developed that enable multiple devices to wirelessly communicate within a local area network ("LAN"). An example of this is the Bluetooth protocol that forms wireless "piconets" designed specifically to replace the interconnecting wires and cables among several portable devices. Audio and data signals can be transmitted within such wireless LAN's. Another wireless connectively solution is the wireless Ethernet standard promulgated by the IEEE as the IEEE 802.11 et. seq. standard, known to those skilled in the art. This standard defines a wireless extension of the Internet using the TCP/IP protocol standard in a 2.4 GHz (ISM band), 5.8 GHz band and other wireless Ethernet environments. The implementation of such a system is colloquially known as an Internet Wi-Fi Hotspot. The IEEE has promulgated other wireless TCP/IP network solutions. Other wireless connectivity standards are known and even more will certainly be developed as the demand for wireless connectivity continues to grow.

With respect to the acoustic reproduction of audio content, each of the aforementioned devices, whether connected by cable or wirelessly, requires an electro-mechanical transducer to create sound. Headphones and earphones are frequently used, but many users prefer audio reproduction through loudspeakers. When there is a plurality of audio content sources, the implementation of a plurality of amplifier and loudspeaker systems quickly becomes impractical. In fact, even a single dedicated amplified loudspeaker for one of these devices is cumulative to existing amplifier and loudspeaker systems that most users already possess, such as the aforementioned portable stereo, the automotive stereo, and the home high-fidelity stereo system. Thus, there is a need in the art for a system method for connecting wirelessly coupled audio content delivery terminal devices to existing high-fidelity stereo systems.

SUMMARY OF THE INVENTION

The need in the art is addressed by the apparatus and methods of the present invention. A network interface cassette for coupling signals between a wireless network and a tape head in a cassette tape player is taught. The network interface cassette includes an enclosure that is conformed to the cassette tape form factor. It contains a transceiver that converts base band signals for radio frequency communications within the wireless network. It also contains a network controller that is coupled to communicate the base band signals with the transceiver. The network controller converts digital audio signals to and from the base band signals. There is an audio processor that converts the digital audio signals to analog audio signals. A coupling means converts the analog audio signals to magnetic audio signals. The coupling means is aligned to couple the magnetic audio signals to the tape head.

In a specific embodiment of the invention, the network interface cassette also includes a power supply disposed within the enclosure that provides electric power to the transceiver, the network controller, and the audio processor. In a refinement, the power supply further includes a switch positioned for actuation when the enclosure is inserted into the tape player. Upon actuation, the switch couples the electrical power. In one embodiment, the cassette player includes a rotating capstan and a pinch roller, and the power supply further includes a generator for producing the electric power. The generator is rotatably coupled to the capstan shaft so that it derives mechanical power therefrom. The generator may be rotatably coupled to the capstan by a tape engaged between the capstan and the pinch roller. The generator may be rotatably coupled to the capstan by a means for multiplying rotational speed.

In another specific embodiment, the network interface cassette is adapted to provide an ear and mouth signal interface for a wireless network enabled cellular telephone. In this embodiment, a microphone input is coupled to the audio processor, and is used for inputting microphone signals. The audio processor converts the microphone signals to digital microphone signals. The network controller converts the digital microphone signals to base band wireless network signals for coupling to, and transmission from, the transceiver and into the wireless network. This arrangement enables ear and mouth signal communications with the cellular telephone through utilization of the microphone input and the cassette tape player audio playback capabilities. In another embodiment, the network interface cassette also includes a microphone coupled to the microphone input.

In a refinement to the invention, the network interface cassette further includes an auxiliary audio input coupled to the audio processor, which is for receiving auxiliary audio signals. The audio processor couples the auxiliary audio signals to the coupling means. In another embodiment, the network interface cassette further includes an audio output that receives the analog audio signals from the audio processor. This arrangement enables the connection of an external device.

In another specific embodiment of the present invention, the network interface cassette includes an additional module for enabling a wireless user interface connection. The module includes a module transceiver, which converts base band signals for radio frequency communications within the wireless network, and a module network controller, which communicates the base band signals with the module transceiver. The module transceiver converts digital audio signals to and from the base band signals. The module also includes a module audio processor that converts the digital audio signals to analog audio signals, and a module interface that couples analog audio signals with the module audio processor. In operation, the module network controller establishes audio connections with the cassette network controller through the module transceiver and the cassette transceiver, which occurs according to a wireless network protocol.

In a refinement to the prior embodiment, the module interface includes a module microphone input that receives analog microphone signals. It may also include a module microphone coupled to the module microphone input. In another refinement to the invention, the module interface has a module audio output that receives the analog audio signals from the audio processor, thereby enabling the connection of an external device. In another embodiment of the module, it includes a module power supply that provides electric power to the module transceiver, the module network controller, and the module audio processor. In an improved version of the module, it includes a photovoltaic cell coupled to the module power supply.

The present invention also teaches a method of reproducing audio signals between a wireless network and a tape head in a cassette tape player. The method includes the steps of converting base band signals for radio frequency communications within the wireless network, then converting digital audio signals to and from the base band signals. The method further includes the steps of converting the digital audio signals to analog audio signals, and converting the analog audio signals to magnetic audio signals. Finally, the step of coupling the magnetic audio signals to the tape head by inserting an enclosure conformed to the cassette tape form factor into the cassette tape player, thereby enabling the reproduction of audio signals by the cassette tape player.

In a specific embodiment of the method, the converting steps are accomplished by semiconductor devices, which are powered by a power supply disposed within the enclosure. An improvement to the method includes the steps of actuating a switch upon inserting the enclosure into the cassette tape player, thereby coupling the power supply to the semiconductor devices. In another embodiment, the cassette player includes a rotating capstan and a pinch roller, and the method includes the further steps of coupling mechanical power from the capstan to the generator, and generating electric power with that mechanical power. The step of rotatably coupling to the capstan with a tape engaged between the capstan and the pinch roller may be added. An improvement adds the step of multiplying the rotational speed of the capstan to increase the generator speed.

A specific embodiment of the foregoing method is adapted to provide ear and mouth telephone signals for a wireless network enabled cellular telephone. This embodiment includes the steps of inputting analog microphone signals and converting them to digital microphone signals. Then, converting the digital microphone signals to base band wireless network signals for coupling to, and transmission from, the wireless network. In an improvement, the step of coupling auxiliary audio signals from an auxiliary audio input, prior to the converting the analog audio signals to magnetic audio signals step, is added. Another improvement further includes the step of establishing a first streaming audio connection from an external wireless network device to the tape head, thereby enabling acoustic audio reproduction through the cassette tape player. In a refinement of the improvement, the step of establishing a second streaming audio connection from a microphone to the external wireless network device is added.

In another specific embodiment of the method, priority control is added. This includes the steps of establishing a first streaming audio connection, having a first priority assigned thereto, from an external wireless network device to the tape head. Then, receiving a request for a second streaming audio connection, having a second priority assigned thereto, and preempting the first streaming audio connection if the second priority is higher than the first priority. In a further improvement to the priority control method, the steps of establishing a second streaming audio connection according to the request, and reverting to the first streaming audio connection when the second streaming audio connection is terminated are added.

In a further embodiment, an apparatus for interfacing external signals to a cassette tape player having a tape head and a first tape transport spindle is taught. The apparatus includes an enclosure, conformed to the cassette tape form factor. The enclosure contains a circuit for converting the external signals to audio signals and a coupling means that operates to convert the audio signals to magnetic audio signals, and that is aligned to couple the magnetic audio signals to the tape head. A first sensor means is also disposed within the enclosure, which operates to detect rotation of the first spindle.

In a specific embodiment of the previous invention, the first sensor means is coupled to connect electric power to the circuit upon detecting rotation of the first spindle. In another embodiment, first sensor means is further coupled to disconnect electric power from the circuit upon sensing cessation of rotation of the first spindle. A timer may be coupled to the first sensor means. The timer operates to delay the time between sensing cessation of rotation of the first spindle and disconnecting electric power. The first sensor means may be a centrifugal switch. In a refinement of the foregoing embodiment, the first sensor means comprises a collar adapted to engage the first spindle and a switch coupled to detect movement of the collar. In a further refinement, the first sensor means is further operates to detect increased rotation speed of the first spindle. The refined first sensor means may be a centrifugal switch responsive to a predetermined rotation speed threshold.

In a specific embodiment of the foregoing invention, the circuit performs plural functions, and operates to select one of the plural functions in response to receipt of a detection of increased rotation speed signal from the first sensor means. In another specific embodiment, the apparatus includes a signal generator that is coupled to output a control signal to the tape head in response to receipt of a detection of increased speed signal from the first sensor means. In a further refinement, the control signal emulates a "blank space" signal, such as produced between sounds tracks where the tape of an audio cassette passes rapidly across the tape head in auto-search capable cassette players.

In another specific embodiment of the foregoing invention, the apparatus is operates to couple signals between the cassette tape player and external signals from a wireless network. In this embodiment, the circuit further includes a transceiver that operates to convert base band signals for radio frequency communications within the wireless network. A controller is coupled to communicate the base band signals with the transceiver, and operates to convert audio signals to and from the base band signals. The controller operates to select from among plural functions in response to receipt of a detection of increased speed signal from the first sensor means. In a refinement of this embodiment, the plural functions include selection of communications among plural wireless devices. In another refinement, the plural functions include selection from among plural Bluetooth commands.

In another specific embodiment of the foregoing invention, the cassette tape player includes a second tape transport spindle, and the apparatus further includes a second sensor means that operates to detector rotation of the second spindle. In a refinement to this embodiment, wherein the circuit performs plural functions, the circuit selects one of the plural functions in response to receipt of a detection signal from the second sensor means.

In a further embodiment of the present invention, a method for interfacing external signals to tape head in a cassette tape player having a first tape transport spindle using circuitry disposed within an enclosure conforming to the cassette tape form factor is taught. The method includes the steps of detecting rotation of the first spindle. And, upon this event, converting the external signals to audio signals, converting the audio signals to magnetic audio signals, and coupling the magnetic audio signals to the tape head.

In a specific embodiment of the previous method, it further includes the step of coupling electric power to the circuitry upon detecting rotation of the first spindle. In a refinement, the method further includes the step of disconnecting electric power from the circuitry upon sensing cessation of rotation of the first spindle. In a further refinement, the method also includes the step of delaying the disconnecting step. The detecting step may be accomplished centrifugally.

In another specific embodiment of the foregoing method, it further includes the step of detecting increased rotation speed of the first spindle. This may be accomplished using a centrifugal switch activated at a predetermined rotation speed threshold. In another refinement, wherein the circuitry performs plural functions, the method also includes the step of selecting one of the plural functions in response to detecting increased rotation speed of the first spindle. In a further refinement, the method also includes the step of generating a control signal to the tape head in response to detecting increased rotation speed of the first spindle. The control signal may emulate a "blank space" signal, such as produced between sounds tracks where the tape of an audio cassette passes rapidly across the tape head in auto-search capable cassette players.

In another specific embodiment of the foregoing method, wherein the circuitry includes a transceiver and a controller, and that operates to couple signals with the cassette tape player, and wherein the external signals communicate with a wireless network, the method includes for the following additional steps. These are the steps of converting base band signals to external signals for radio frequency communications within the wireless network, and communicating the base band signals with the transceiver, and converting audio signals to and from the base band signals, and selecting from among plural functions in response to the detecting increased rotation speed of the first spindle step. The plural functions may include selection of communications among plural wireless devices. They may also include selection from among plural Bluetooth commands.

In another specific embodiment of the foregoing method, wherein the cassette tape player includes a second tape transport spindle, the method includes the further step of detecting rotation of the second spindle. In a refinement, wherein the circuitry performs plural functions, the method includes the further step of selecting one of the plural functions in response to the detecting rotation of the second spindle step.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

The wireless network interface cassette adapter and method of the present invention bridges the gap between wireless audio content delivery terminal devices of varying types and existing high fidelity audio playback systems. The existence of wireless local area network connectivity and standardized magnetic tape playback systems are advantageously leveraged to provide users with a low cost, convenient, and flexible audio reproduction system. The teachings of the present invention are applicable to any wireless local area network standard, whether presently defined and deployed, or those that may be later developed. In specific embodiments, the Bluetooth piconet personal area network ("PAN") and Wi-Fi wireless local area network ("WLAN"), as defined by IEEE standard 802.11 et. seq. and its progeny, are contemplated. However, those skilled in the art will readily appreciate that the teachings of the present invention are applicable and useful for any digital wireless system capable of wirelessly coupling audio content. This is true whether the content comprises discrete audio files, compressed audio files, streaming, pseudo real-time, delivery systems, or voice data in the form of text-to-speech.

Figure 1:
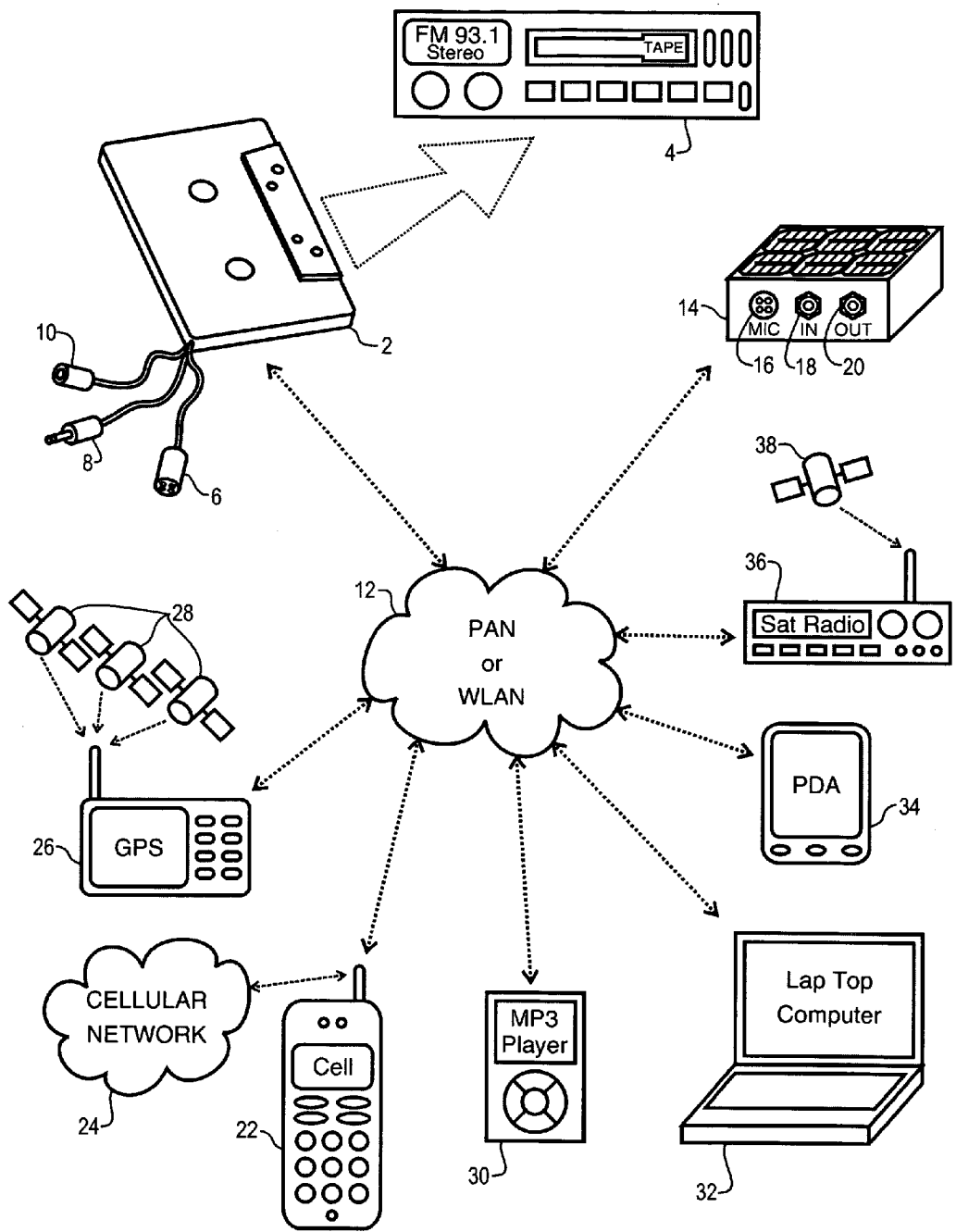
FIG. 1 is a system diagram of an illustrative embodiment of the present invention.

Reference is directed to FIG. 1, which is a system diagram of an illustrative embodiment of the present invention. Bluetooth personal area networks ("PAN") 12 or WiFi wireless local area networks ("WLAN") 12 exists by virtue of the presence of two or more compliant devices, as is understood by those skilled in the art. Collectively, these will be referred to as wireless locals area networks ("WLAN") herein. A variety of compliant terminal devices are also known. If FIG. 1, there is illustrated a direct broadcast satellite ("DBS") radio receiver 36, which is compliant with the WLAN 12. DBS receivers obtain audio content from one or more orbiting satellites 38. In the case of a WLAN compliant DBS receiver 36, the device 36 includes controller and transceiver hardware and software that enable the receiver 36 to couple digital audio content within the WLAN 12. In a similar vein, personal digital assistants ("PDA") 34 are known that are WLAN compliant, and are able to send and receive digital audio content within the WLAN 12. Of course, laptop and palm-top personal computing devices 32 are also known to be WLAN 12 compliant. Modern digital audio file players, such as MP3 compliant players 30 are known to be WLAN 12 enabled as well. Another WLAN compliant device is a global positional system ("GPS") receiver 26, which receives time and location information from a constellation of low-earth orbiting satellites 28. Such receivers are known to output audio content, and can do so within a WLAN 12.

Current cellular and wireless telephones (collectively "cellular telephones"), including third generation technology ("G3") cellular telephones 22 that are known to be WLAN complaint. In addition to communicating over cellular telephone networks 24, such cellular telephones 22 include a controller and transceiver that enable communications within the WLAN 12. The transfer of audio content is duplex in such cellular telephones so that both ear and mouth signals can be simultaneously transferred. With such operation, the microphone and earphone interface for the cellular telephone can be provided over the WLAN 12. For example, a wireless headset could be provided for the cellular telephone 22, which couples the ear and mouth signals through the WLAN 12.

FIG. 1 illustrates the variety of audio content terminal devices that are WLAN enabled, and that can send and receive audio content through a WLAN. The apparatus in an illustrative embodiment of the present invention is the network interface cassette adapter ("NIC") 2. The NIC 2 conforms to the physical size and dimensions of a cassette tape cartridge for the intended cassette tape player 4, and therefore, can be inserted into the cassette tape player 4. Stated at a systems functionality level, the NIC 2 couples radio frequency signals with the WLAN 12, which include both WLAN protocol signals and encoded audio content, and converts a portion of these signals to magnetic audio signals corresponding to the audio content, a portion of which are coupled to a magnetic tape head (not shown) within the cassette tape player 4. The audio content can then be amplified and reproduced by the existing circuitry and components (not shown) of the cassette tape player 4. The user can therefore reproduce WLAN 12 audio content from any of the aforementioned WLAN compliant devices through the cassette tape player 4.

In a particular embodiment, the NIC 2 includes an external microphone 6, which is connected via a cable to the NIC enclosure 2. In operation, this microphone 6 cable passes outside of the cassette player 4 tape opening. A typical use of the wired microphone 6 is to provide the mouth interface in a cellular telephone hands-free mode of operation. The loudspeakers (not shown) of the cassette tape player 4 provides the ear interface. The NIC 2 converts the analog ear and mouth signals into the radio frequency domain and radiates these signals into the WLAN 12. The cellular telephone 22 couples these signals from the WLAN 12 and then converts them into the radio frequency domain of the cellular network 24. Hands free cellular telephone operation is known to those skilled in the art. The advantage of the illustrative embodiment is that the loudspeakers of the cassette tape player 4 are utilized instead of requiring a separate amplifier and loudspeaker to accomplish the desired task. This is particularly well suited to the vehicular environment. The microphone 6 can be clipped to the dashboard of the vehicle, in a position suitable to intercept the spoken voice of the occupants, and the vehicle stereo high-fidelity speakers are used to reproduce the audio received in a telephone conversation.

The NIC 2 in illustrative embodiment of FIG. 1 also includes an output connector 8, which may be an industry standard ⅛" stereo plug. This connector 8 outputs the same audio content that is coupled to the magnetic tape head in the cassette tape player 4. This is useful if the user desires to record the audio content into a separate recording device that is not in and of itself WLAN compliant. In this embodiment, the output connector 8 is cabled to the NIC 2 enclosure, and passes through the cassette tape opening in the cassette tape player 4. The illustrative embodiment also includes an auxiliary input jack 10, which is also cabled to the NIC enclosure 2. The jack may be an industry standard ⅛" stereo jack. This input 10 allows the user to couple an external audio source to the system. For example, the user can connect the headphone output of a CD player, so that the CD audio content can be coupled through to the cassette tape player 4 tape head. The auxiliary input is particularly useful for connecting audio content sources that are not otherwise WLAN enabled.

There are situations where a wired interface connector is not desirable. For example, some cassette tape player cassette door openings do not lend themselves to having wires and cables passed through during operation. A specific embodiment of the present invention addresses this issue, among others, by providing a wireless user interface adaptor ("WIA") 14. The WIA offers the same microphone 16, auxiliary input 18, and auxiliary output 20 as discussed above, but without the need to have wires or cables pass through the cassette tape player 4 opening. This accomplished be making the WIA a WLAN compliant device in and of itself. In operation, duplex audio paths are set up through the WLAN 12 between the NIC 2 and the WIA 14. The interface signals can therefore be communicated wirelessly. The WIA will be more fully discussed hereinafter.

Figure 2:
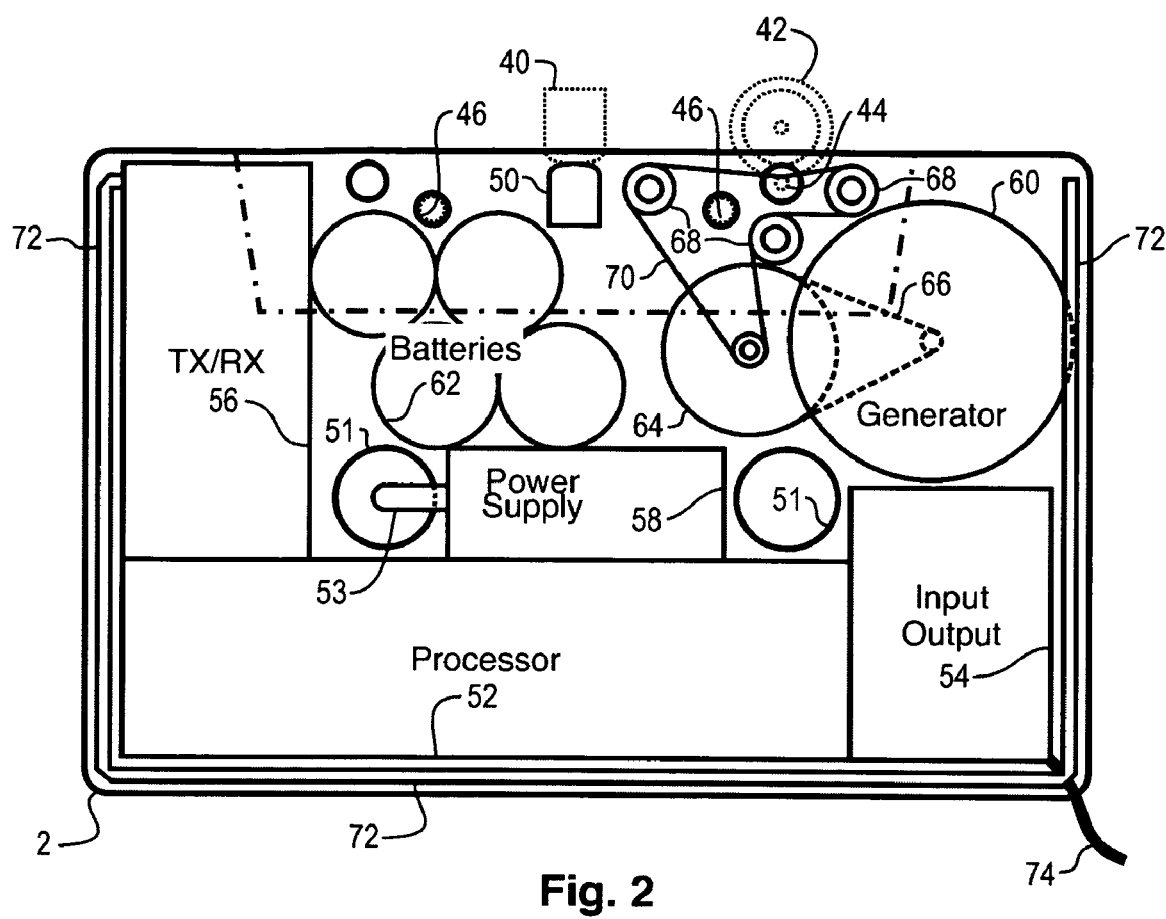
FIG. 2 is a diagram of a network interface cassette adapter according to an illustrative embodiment of the present invention.

Reference is now directed to FIG. 2, which is a diagram of the network interface cassette adapter ("NIC") 2 according to an illustrative embodiment of the present invention. A NIC enclosure 2 is designed to conform to the cassette tape form factor. In the illustrative embodiment, the common stereo cassette tape, as currently used in the majority of consumer tape players, is conformed to. However, the scope of the present invention extends to magnetic tape cartridges and cassettes of all types. FIG. 2 illustrates the relative position of the magnetic tape head 40 of the cassette tape player (not shown). Also, the capstan shaft 44 and pinch roller 42 of the cassette tape player are shown in the playback positions. The cassette tape player alignment pins 46 are also illustrated. Those skilled in the art are familiar with the cassette tape form factor, and the playback operation of such machines. When the NIC enclosure 2 is inserted into a cassette tape player, a magnetic transducer 50 is held in alignment with the tape head 40 of the cassette player. The magnetic transducer is a stereo device, comprising two coils that convert analog audio signals to magnetic signals. The magnetic field created by the transducer 50 couples to the playback head 40 in the cassette tape player. The audio signals are coupled from the transducer 50 to the tape head 40. Such transducers 50 are known to those skilled in the art.

The magnetic transducer 50 is coupled to an audio input and output circuit 54, which comprises audio signal conditioning and amplification functions useful to match signal levels and impedances amongst the various system components. Such circuitry is known to those skilled in the art. The microphone, auxiliary input, and auxiliary output discussed above are coupled to input and output circuit 54 by cable 74. The input and output circuit 54 is an analog circuit. Analog audio signals are coupled to processor circuitry 52. The processor circuitry 52 provides several functions in the NIC apparatus. These include analog to digital, and digital to analog conversion of the analog audio signals, and, includes general control of the NIC functions. The processor circuitry 52 also provides the WLAN network protocol and signaling control, which will be more fully discussed hereinafter. Ultimately, the processor circuitry 52 provides duplex base band network signals to and from the transceiver 56. The transceiver 56 modulates and demodulates the base band network signals to and from an RF carrier signal. The RF signals art coupled to antenna 72, which electromagnetically couples to the WLAN, as is understood by those skilled in the art. The antenna 72 is routed about the periphery of the enclosure 2, so as to provide good RF coupling, regardless of the type of cassette tape player that the NIC 2 is inserted into.

The various circuits within the NIC 2, in FIG. 1, are electrically powered by a power supply circuit 58, which provides the required voltage and current to operate the NIC 2. A switch actuator 53 is coupled to a switch (not shown) within the NIC 2 enclosure. The actuator 53 is positioned for actuation when the NIC enclosure 2 is inserted into a cassette tape player. Actuation of the switch couples electrical power from the power supply to the circuitry of the NIC 2. In the illustrative embodiment, the actuator engages a reel spindle of the cassette tape player through one of the spindle holes 51 of the enclosure 2, however, any suitable actuator and engagement technique could be employed. A set of batteries 62, which are rechargeable batteries in the illustrative embodiment, are disposed within the NIC enclosure 2. The batteries 62 are coupled to the power supply 58 and provide the power reserve to operate the NIC 2. Replaceable batteries could also be utilized in another embodiment, in which the user replaces the batteries from time to time. However, in the illustrative embodiment, the motive force of the tape player's capstan shaft 44 is advantageously utilized.

In the illustrative embodiment, a compact electric generator 60 is disposed within the NIC enclosure 2. The generator is mechanically coupled to receive rotational force from the capstan shaft 44 of the cassette tape player. Since the cassette tape player is designed to drive a magnetic tape in normal operation, the illustrative embodiment utilizes a small tape loop 70 to couple power. The tape loop 70 is guided between the capstan shaft 44 and the pinch roller 42 by a set of spindle pulleys 68. When the NIC enclosure is inserted into the cassette tape player, the mechanism of the tape player urges the pinch roller 42 against the capstan shaft 44, which thus engages the tape loop 70. The rotation of the capstan shaft 44 moves the tape 70, which is coupled to a driven pulley 64. The diameters of the driven pulley 64 in conjunction with the coupling belt 66 to the generator 60 input pulley effectively multiply the rotational speed of the capstan shaft to an angular velocity suitable for driving the generator 60. Those skilled in the art will appreciate that other means exist for multiplying rotational velocity, such as friction wheels, belts and pulleys, gear trains, and so forth. The electric current generated by the generator 60 is coupled to the power supply. The generated electrical power is used to power the NIC 2 circuitry directly, recharge the storage batteries 62, or both. With the availability of generator power, the NIC 2 is capable of operating for extended periods of time, without attention from the user. In fact, once inserted into the cassette tape player, the NIC 2 can be virtually ignored, effectively turning the conventional cassette tape player into a WLAN enabled device. Installation of the NIC is trivial, even for the unsophisticated user.

Figure 3:
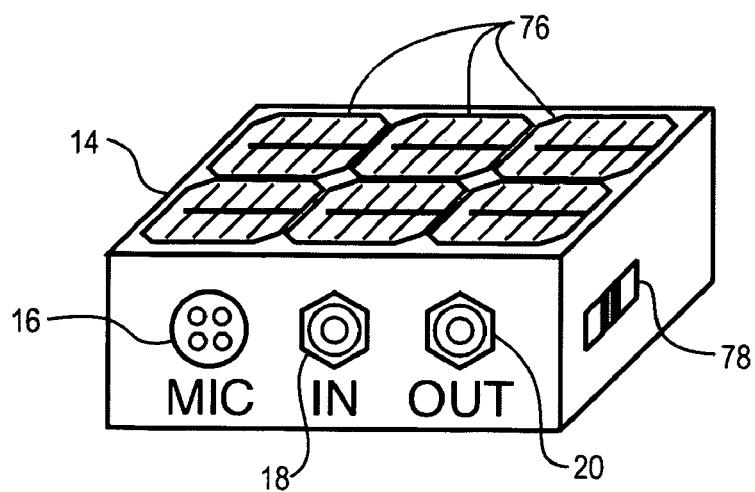
FIG. 3 is a diagram of a wireless user interface adapter according to an illustrative embodiment of the present invention.

Reference is directed to FIG. 3, which is a diagram of a wireless user interface adapter ("WIA") 14 according to an illustrative embodiment of the present invention. The WIA 14 is useful in applications where it is undesirable to route cables to and from the NIC enclosure. The WIA 14 is a stand-alone WLAN enabled input and output device, and thus includes its own processors and transceiver for radio frequency communications through the WLAN. In operation, the WIA 14 may be placed on the dashboard of the user's vehicle, which locates its microphone 16 relatively close to the user, facilitating operation as a hands free speakerphone. As discussed above, an auxiliary input jack 18 and auxiliary output jack 20 are present on the exterior of the WIA enclosure 14. A power switch 78 is presented on the exterior of the enclosure 14. In one embodiment, the WIA 14 includes an array of photovoltaic cells 76 on its top surface. When placed in a sunny location, such as a vehicle dashboard, the photovoltaic cells 76 provide electric current to operate the WIA 14 and or recharge its internal batteries (not shown).

Figure 4:
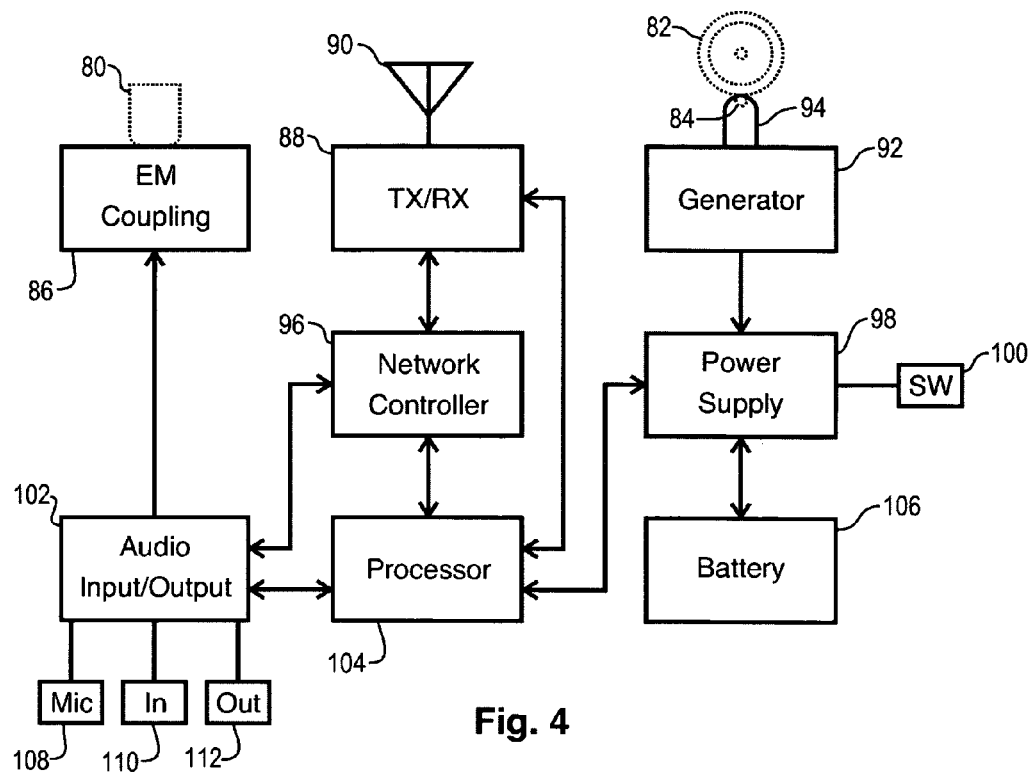
FIG. 4 is a functional block diagram of a network interface cassette adapter according to an illustrative embodiment of the present invention.

Reference is directed to FIG. 4, which is a functional block diagram of a network interface cassette adapter ("NIC") according to an illustrative embodiment of the present invention. The NIC interfaces to a cassette tape player via the player's tape head 80 and the capstan shaft 84 and pinch roller 82. At the WLAN end of the device, the interface is accomplished through an antenna 90, which couples electromagnetic energy with the WLAN. The radio frequency signaling necessarily follows the protocol of the coupled WLAN. These signals include audio data and WLAN protocol data. A radio frequency transceiver 88 is coupled to the antenna 90. The transceiver modulates and demodulates base band WLAN signals. In the illustrative embodiment both duplex and simplex communications paths are supported, thus, the transceiver 88 is either a duplex device or is multiplexed in time or code space. A network controller 96 is coupled to the transceiver 88. The network controller couples digital audio signals from within the NIC and organizes them into and out of base band WLAN signals. Essentially, the network controller provides the protocol layering required for the given WLAN protocol. A digital signal processor is utilized in the illustrative embodiment, however any suitable computer device known to those skilled in the art could be employed for the network controller function.

The network controller 96 is coupled to a processor 104 and audio input and output circuit 102. Together, these circuits provide the audio processor functions of the device, as well as the general microcontroller functions employed in typical dedicated control devices. The audio processor function encodes and decodes analog audio signals to and from digital audio signals, as well as managing audio path connections and signal levels. The processor 104 may be any suitable computing device know to those skilled in the art, and may even be the same physical device as the network controller 96. The distinction between network control and audio processing is primarily functional. The audio processor couples analog audio signals and converts them into the digital domain, while the network controller manages WLAN protocol and overhead functions. The audio input and output circuit 102 portion of the audio controller includes the microphone 108, the auxiliary input 110, and auxiliary output connectors, in embodiments where these items are wired to the NIC. The audio input and output circuit also couples analog audio signals to the electromagnetic coupling means 86, which converts these signals to magnetic signals for coupling with the tape head 80. All of the audio circuits can be either stereophonic or monaural, simplex or duplex as required for each application.

The functional block diagram in FIG. 4 also illustrates the various power supply functions of the NIC. The power supply circuit 98 provides the required voltages and currents to the various components within the NIC. A power switch 100 provides the typical on and off function, by controlling coupling of electrical power to components within the NIC. A storage battery 106 is one source of raw electrical power. A generator 92 is disposed within the NIC, and is another source of raw power. The generator 92 is driven, either directly or indirectly, from a tape loop 94 that couples rotational mechanical energy from the tape player capstan 84 and pinch roller 82. The generator may either power the NIC through the power supply 98, or be used to recharge the storage batteries 106.

Figure 5:
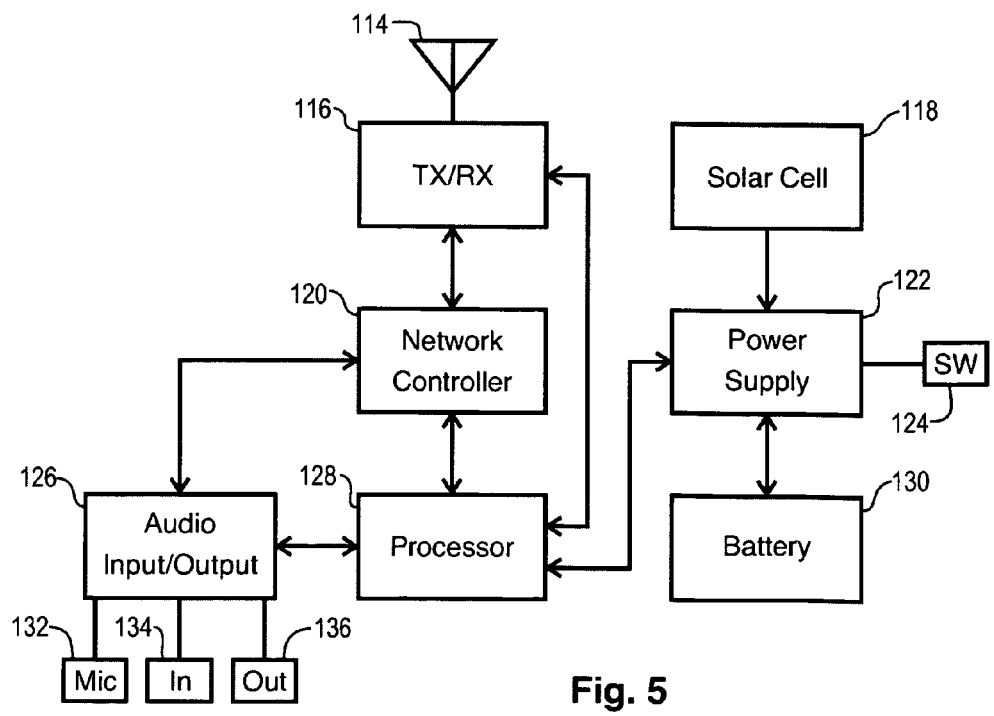
FIG. 5 is a functional block diagram of a wireless user interface adapter according to an illustrative embodiment of the present invention.

Reference is directed to FIG. 5, which is a functional block diagram of a wireless user interface adapter ("WIA") according to an illustrative embodiment of the present invention. The WIA interface to the WLAN is accomplished through an antenna 114, which couples electromagnetic energy with the WLAN. The radio frequency signaling necessarily follows the protocol of the coupled WLAN. These signals include audio data and WLAN protocol data. A radio frequency transceiver 116 is coupled to the antenna 114. The transceiver modulates and demodulates base band WLAN signals. In the illustrative embodiment both duplex and simplex communications paths are supported, thus, the transceiver 116 is either a duplex device or is multiplexed in time or code space to provide duplex communications capability. A network controller 120 is coupled to the transceiver 116. The network controller 120 couples digital audio signals from within the WIA and organizes them into and out of base band WLAN signals. Essentially, the network controller 120 provides the protocol layering required for the given WLAN protocol. A digital signal processor is utilized in the illustrative embodiment, however any suitable computer device known to those skilled in the art could be employed for the network controller function.

The network controller 120 is coupled to a processor 128 and audio input and output circuit 126. Together, these circuits provide the audio processor function of the device, as well as the general microcontroller functions employed in typical dedicated control devices. The audio processor function encodes and decodes analog audio signals to and from digital audio signals, as well as managing audio path connections, signal levels and so forth. The processor 128 may be any suitable computing device know to those skilled in the art, and may even be the same physical device as the network controller 120. The distinction between network control and audio processing is primarily functional. The audio processor couples analog audio signals and converts them into the digital domain, while the network controller 120 manages WLAN protocol and overhead functions. The audio input and output circuit 126 portion of the audio controller includes the microphone 132, the auxiliary input 134, and auxiliary output 136 connectors. All of the audio circuits can be either stereophonic or monaural, simplex or duplex as required for each application.

Power supply management in the WIA is managed by a power supply circuit 122, which includes a conventional on-off switch 124. An internal storage battery 130 is provided to power the device. While user replaceable batteries are used in one embodiment, a rechargeable battery is used in the specific embodiment. This enables to the use of photovoltaic cells 118. The photovoltaic cells can either power the WIA directly or recharge the storage batteries 130, or both. In operation the WIA of FIG. 5 serves as a wireless interface to the NIC, with communications there between accomplished through WLAN audio connection paths. This is essentially the same communications protocol used between the NIC and the various audio content terminal devices, discussed above.

Figure 6:
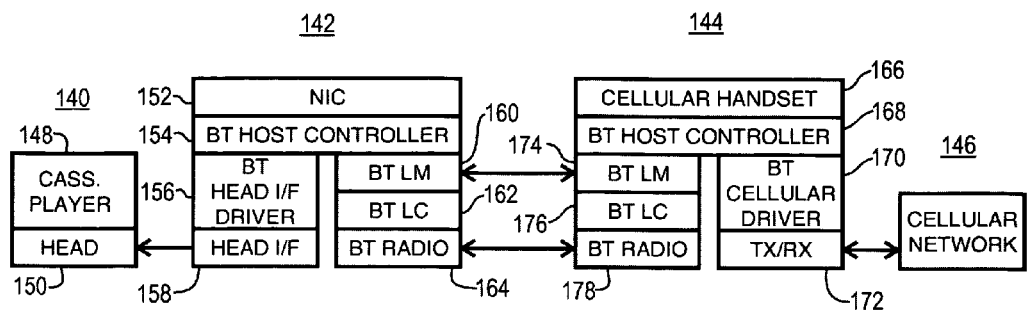
FIG. 6 is a functional diagram of a cassette tape player to a wireless network Bluetooth connection according to an illustrative embodiment of the present invention.

Reference is directed to FIG. 6, which is a functional diagram of a cassette player to a cellular network Bluetooth connection through a NIC according to an illustrative embodiment of the present invention. The illustrative embodiment WLAN is implemented as a Bluetooth personal area piconet network. The audio content transfer scenario depicted in FIG. 6 involves half of a telephone call from a third party located somewhere in a cellular network 146, which is coupled through to a cassette player 140, via a cellular telephone handset 144 and a NIC 142. The diagram in FIG. 6 is structured as a conventional ISO network architectural model, known to those skilled in the art. At the physical level, the coupling between the cellular network 146 and the cellular telephone 144 occurs as cellular radio signals between the cellular network 146 and the cellular transceiver 172. The physical link between the cellular handset 144 and the NIC 142 occurs through Bluetooth radio signals between the cellular handset Bluetooth radio 178 and the NIC Bluetooth radio 164. The physical link between the NIC 142 and the cassette tape player 140 occurs via magnetic flux coupling between the NIC head interface means 158 and the cassette tape player head 150. Above the physical layer is the hardware/software interface layers, which include the software to hardware drivers.

The NIC 142 head interface means 158 is coupled to the NIC Bluetooth host controller 154 by a Bluetooth head interface driver 156. On the Bluetooth radio link side of the NIC 142, the Bluetooth link controller 162 and Bluetooth link manager 160 couple to the Bluetooth host controller. This structure is well known to those skilled in the art. The Bluetooth radio 164 in the NIC 142 communicates with the Bluetooth radio 178 in the cellular handset 144. At the link level, the corresponding link mangers 160 and 174 control the Bluetooth session. The cellular handset Bluetooth link controller 176 provides the physical to software interface on the cellular handset 144 side. The Bluetooth host controller 168 in the cellular handset 166 couples to the Bluetooth cellular radio driver, which physically couples to the cellular transceiver 172. Thus, the audio content is transferred across both the cellular network and the Bluetooth network forming an end-to-end link. The diagram in FIG. 6 is illustrative of a typical audio content link established for one session through the network. Other links, such as the coupling of microphone audio from the NIC to the wireless network, would be accomplished with a similar network session model.

Figure 7:
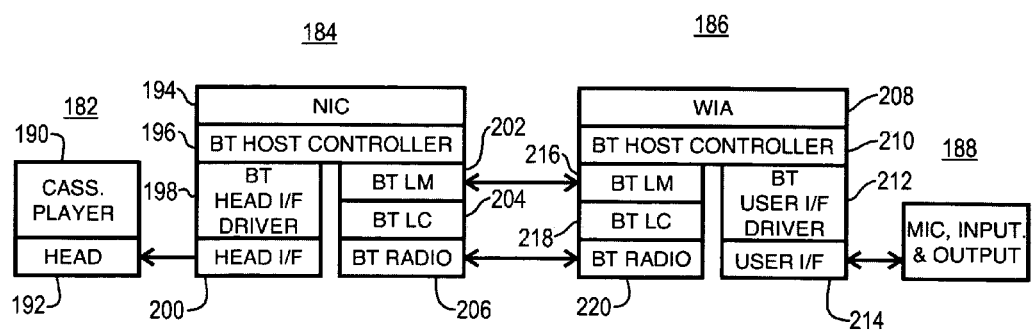
FIG. 7 is a functional diagram of a cassette tape player to a wireless user interface Bluetooth connection according to an illustrative embodiment of the present invention.

Reference is directed to FIG. 7, which is a functional diagram of a cassette player 182 to a wireless user interface adapter ("WIA") 186 Bluetooth connection according to an illustrative embodiment of the present invention. This diagram uses the ISO network model to illustrate an audio content connection from an auxiliary input to the WIA 188, played through the cassette tape player 182. The physical link between the WIA 186 and the actual user connection 188 occurs through cables connected by a user, or actual acoustic audio waves coupling to the microphone (not shown). In this scenario, the input 188 is from an external auxiliary audio device, such as a CD player. Bluetooth radio signals between the WIA Bluetooth radio 220 and the NIC Bluetooth radio 206 for the physical layer between these devices. The physical link between the NIC 184 and the cassette tape player 182 occurs via magnetic flux coupling between the NIC head interface means 200 and the cassette tape player head 192. Above the physical layer, is the hardware/software interface layers, which include the software to hardware drivers.

The NIC 184 head interface means 200 is coupled to the NIC Bluetooth host controller 196 by a Bluetooth head interface driver 198. On the Bluetooth radio link side of the NIC 184, the Bluetooth link controller 204 and Bluetooth link manager 202 couple to the Bluetooth host controller 196. The Bluetooth radio 206 in the NIC 184 communicates with the Bluetooth radio 220 in the WIA 186. At the link level, the corresponding link mangers 202 and 216 control the Bluetooth session. The WIA Bluetooth link controller 218 provides the physical to software interface on the WIA 186 side. The Bluetooth host controller 210 in the WIA 208 couples to the Bluetooth user interface driver 212, which physically couples to the user interface connectors 214. Thus, the audio content is transferred from a physical connection in the WIA, across the Bluetooth network forming an end-to-end link to the cassette tape player.

Figures 8, 9:
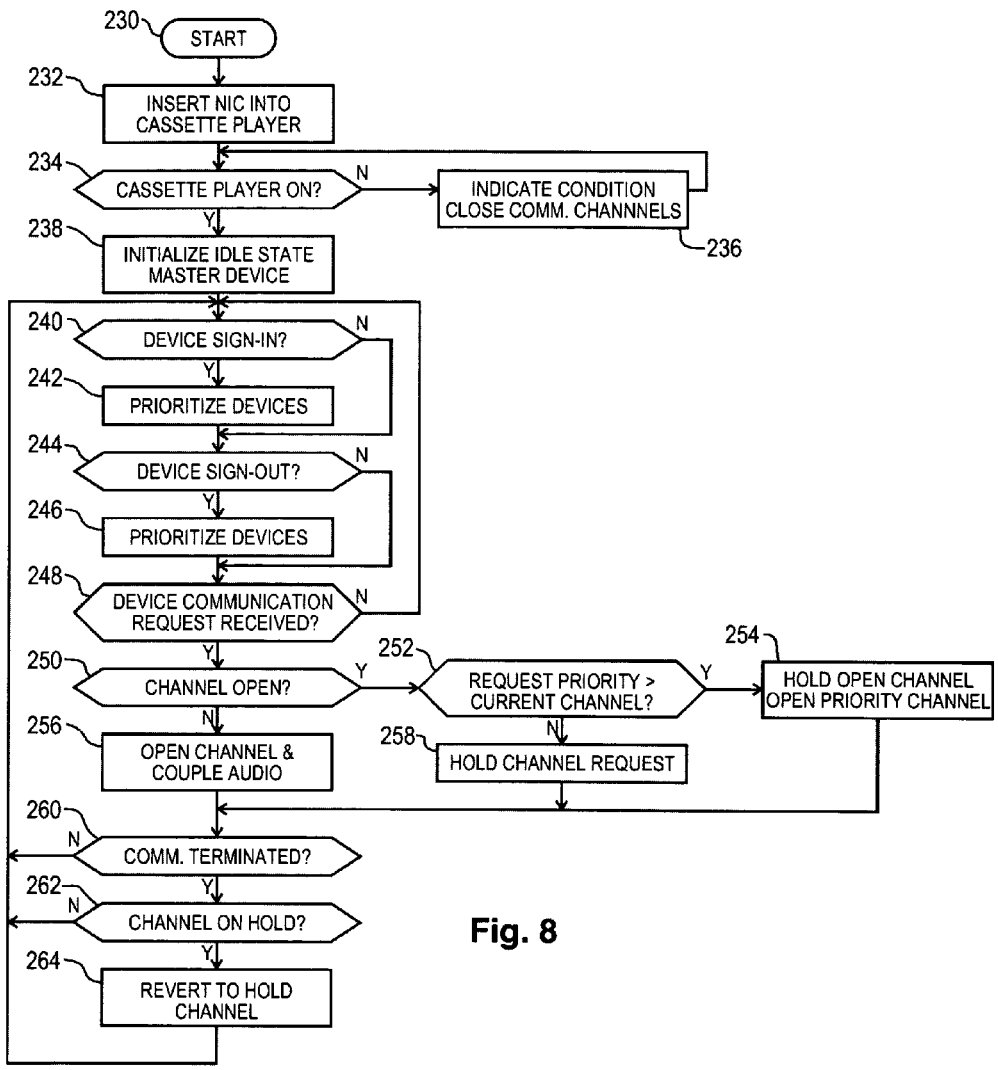
FIG. 8 is a process flow diagram according to an illustrative embodiment of the present invention.
FIG. 9 is a priority table according to an illustrative embodiment of the present invention.

Reference is directed to FIG. 8, which is a process flow diagram according to an illustrative embodiment of the present invention. The process illustrated in FIG. 8 involves the operation of the NIC as inserted into a cassette tape player, with subsequent audio content channel requests and prioritization. The process begins at step 230 and proceeds to step 232 when the user inserts the NIC into their cassette tape player. This action turns on the power of the NIC, which tests to determine if the cassette player is on. This test can be accomplished in a number of ways, in the illustrative embodiment, the rotating capstan shaft is an indicator that the cassette is both on and in the playback mode of operation. Obviously, the playback mode is required in order to cause audio content to be reproduced through the cassette player. If the cassette player is not ready in step 234, flow proceeds to step 236 where the user is presented with an indication that the cassette player is not ready. The indication may be visual or audible, such as a light or beep sound, for example. If a communications channel is already open in the network, it is closed at step 236, since reproduction by the cassette player is no longer possible.

Continuing in FIG. 8, if the cassette player is on at step 234, flow proceeds to step 238. At step 238, the NIC initializes an idle state of operation, and establishes itself as a master device in the Bluetooth network. The idle state enables other device to establish communications with the NIC from time to time. At step 240, the main operating loop of the process is entered, and a test is made to determine if any other network devices have signed in. If another device has signed in, then the new device priority is checked and recorded at step 242. Device priorities are needed to establish resource allocation corresponding to the different priorities. Priorities will be more fully discussed below. On the other hand, at step 240, if no new device has singed in, then flow proceeds to step 244, to test whether any device has signed out, or simply stopped communicating through the network. If a device has signed out at step 244, then flow proceeds to step 246, where the remaining devices still signed into the network are re-prioritized. On the other hand, at step 244, if no device has signed out, flow proceeds to step 248.

Step 248 in FIG. 8 is a test to determine if any of the devices currently signed into the network have made a communications request. Such a request occurs when one of the devices is attempting to transfer audio content to another device. Typical examples include an incoming telephone call, tuning in a DBS satellite station, playing a song through the MP3 player, and so forth. If no device has made a communications request at step 248, flow returns in loop fashion to step 240, where the aforementioned sing-in and sign-out tests are repeated. On the other hand, at step 248, if a device has made a communications request, then flow continues to step 250 to determine if there is an existing channel open. Since the cassette tape player can only reproduce one channel at a time, it is important to determine if the requesting device has a higher or lower priority prior to assigning a new terminal device for audio content reproduction. If there are two contending requests, the present invention uses a priority scheme to arbitrate the contention.

At step 250, if there is a channel already open, then the requesting channel's priority is checked against the current channel. If the new request has an equal or lower priority, the current channel retains the resource and the new channel request is held at step 258, and flow proceeds to step 260. On the other hand, if the new channel request has a higher priority at step 252, then the current channel is held at step 254 and the new request is coupled as well. Flow proceeds to step 260. To complete the flow from step 250, if no channel is open, then the new request is assigned a new channel and flow continues to step 260.

The priority test and call hold features of the present invention allow the user to enjoy lower priority services yet not miss higher priority services. The technique used is to hold a lower priority resource until the higher priority communications is completed, and then revert to the lower priority communications. The reversion actions begins at step 260 in FIG. 8. If the current communications channel has not been terminated, then flow returns to step 240, to repeat the aforementioned sequences, including prioritization of any new requests. On the other hand, at step 260, if a communications channel has been terminated, then a test is made at step 262 to determine if there is a communications request on hold. If not, flow returns to step 240. If there is a communications request on hold at step 262, then the channel reverts to the held request at step 264 before the process returns to the main loop.

Reference is directed to FIG. 9, which is a priority table according to an illustrative embodiment of the present invention. In the illustrative embodiment, three priority levels are employed. Of course, any number of priorities could be defined. The lowest priority is Priority 3, box 274, which consists of entertainment only sources of audio content. MP3, Satellite Radio, and TV Audio content 280 are set to Priority 3. The mid-level priority is Priority 2, box 272, which consists of Weather Radio, GPS information, and PDA content 278. The highest priority level is Priority 1, box 270, which consists of cellular telephone calls, and Internet Voice communications 276. The priority levels may also be user defined. As defined in FIG. 9, cellular telephone communications request would preempt MP3 playback, as so forth.

Figure 10:
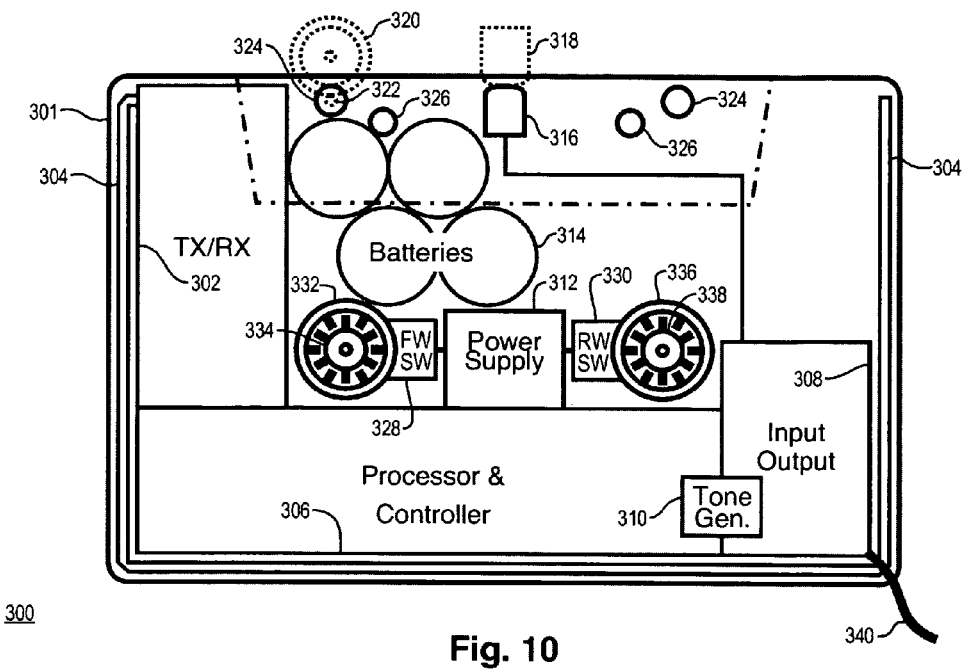
FIG. 10 is a diagram of a network interface cassette adapter according to an illustrative embodiment of the present invention.

Reference is now directed to FIG. 10, which is a diagram of the network interface cassette adapter ("NIC") 300 according to an illustrative embodiment of the present invention. FIG. 10 illustrates improved power control and feature selection embodiments of the present invention. A NIC enclosure 301 is designed to conform to the cassette tape form factor. In the illustrative embodiment, the common stereo cassette tape, as currently used in the majority of consumer tape players, is conformed to. However, the scope of the present invention extends to magnetic tape cartridges and cassettes of all types. FIG. 10 illustrates the relative position of the magnetic tape head 318 of the cassette tape player (not shown). Also, the capstan shaft 322 and pinch roller 320 of the cassette tape player are shown in the playback positions. The capstan shaft holes 324 in the cassette enclosure 301 are illustrated. The cassette tape player alignment-pin holes 326 are also illustrated. Those skilled in the art are familiar with the cassette tape form factor, and the playback operation of such machines. When the NIC enclosure 301 is inserted into a cassette tape player, a magnetic transducer 316 is held in alignment with the tape head 318 of the cassette player. The magnetic transducer 316 is a stereo device, comprising two coils that convert analog audio signals to magnetic signals. The magnetic field created by the transducer 316 couples to the playback head 318 in the cassette tape player. The audio signals, as magnetic signals are coupled from the transducer 316 to the tape head 318. Such transducers 316 are known to those skilled in the art.

The magnetic transducer 316 is coupled to an audio input and output circuit 308, which comprises audio signal conditioning and amplification functions useful to match signal levels and impedances amongst the various system components. Such circuitry is known to those skilled in the art. The microphone, auxiliary input, and auxiliary output discussed hereinafter are coupled to input and output circuit 308 by cable 340. The input and output circuit 308 is an analog circuit. Analog audio signals are coupled to processor and controller circuitry 306. The processor circuitry 306 provides several functions in the NIC apparatus 300. These include analog to digital, and digital to analog conversion of the analog audio signals, and, includes general control of the NIC 300 functions. The processor circuitry 306 also provides the WLAN network protocol and signaling control, discussed herein before. The processor circuitry 306 provides duplex base band network signals to and from the transceiver 302. The transceiver 302 modulates and demodulates the base band network signals to and from an RF carrier signal. The RF signals are coupled to antenna 304, which electromagnetically couples to the WLAN, as is understood by those skilled in the art. The antenna 304 is routed about the interior periphery of the enclosure 301, so as to provide good RF coupling, regardless of the type of cassette tape player that the NIC 300 is inserted into.

The various circuits within the NIC 300, in FIG. 10, are electrically powered by a power supply circuit 312, which provides the required voltage and current to operate the various circuitries within the NIC 300. The NIC 300 power source in the illustrative embodiment is plural storage batteries 314, which may be of the rechargeable or the replaceable varieties. Since the batteries 314 offer a limited power resource, it is significant that the use of such power is conserved. A forward spindle switch 328 is coupled to a spindle collar 334, which engages the cassette tape player forward spindle 334 when the housing 301 is inserted into the cassette tape player. As the spindle 334 rotates during playback operation of the cassette tape player, the collar 332 is rotated. The forward switch 328 senses this rotation. The rotation of the forward spindle corresponds to the users desire to "play" an audio track, and hence is an appropriate event to activate power to the NIC 300, so that audio content can be received through the wireless network and thus coupled through and reproduced by the cassette tape player amplifier and loudspeaker system. Therefore, the rotation of the forward spindle 334 and the spindle collar 332 activate the forward switch 328, which couples this event to he power supply 312, so that the various circuitries of the NIC 300 and be powered and activated.

In the illustrative embodiment, forward switch 328 is activated by the centrifugal force of the rotating spindle collar 322, which is induced by the rotating tape transport spindle 334 of the tape player. A contact closure within the forward switch 328 is coupled to the power supply 312 for subsequent action. Note that the function of the power control concept here is that the rotating spindle 334 is sensed so that power, or other operations, of the NIC 300 can be activated in response thereto. Those skilled in the art will appreciate that a variety of actuators, sensors, and switches could be employed to achieve this function. Optical, mechanical, magnetic and other sensor types could readily be employed. In the illustrative embodiment, a centrifugal switch is used. A benefit of the foregoing approach to power management is that the user unconsciously correlates the operation of the cassette tape player with the power cycling and function selection in the NIC and the coupled network. Pressing play makes that NIC function, and as will be demonstrated hereinafter, other cassette operations, fast-forward, rewind, etc., cause other functions to be selected.

During normal operation of a cassette tape player, pressing "play" causes the forward spindle to begin rotating. However, rotation of this spindle is not always continuous and consistent during the various modes of operation of the cassette tape player. For example, some mode changes, such as "tape-review" and "tape-search", as well as "fast-forward" and "rewind" operations, can momentarily stop the forward spindle's rotation. For this reason, a hard wired power connection from the forward switch 328 to the powering circuits of the NIC may not be desirable in certain embodiments, as this could cause the system to power-down, shutting down network connections. To alleviate this issue, a particular embodiment of the present invention employs a timer (not shown), which momentarily delays the power-down, or disconnection of power from the circuitry, of the NIC. If the forward spindle ceases rotation for an extended period of time, clearly that user will not expect audio content to be reproduced by the system. The timer is coupled to delay the disconnection of power for a predetermined period of time, such a one second or a few seconds. With this approach, the power saving feature of the embodiment is realized, without the inconvenience of unexpected power-off events. Further details of the timer circuit and functions will be discussed hereinafter.

As noted above, the rotation of the cassette forward spindle, item 334 in FIG. 10, indicates that the user has activated the "play" function and results in the power-on operation of the NIC 300. Another user event in the cassette tape player is the activation of the fast-forward function. This is typically done to advance playback to a subsequent audio track in normal cassette operation. Mechanically, this function of the cassette tape player causes the forward spindle 334 to rotate at a faster speed that it rotates in the "play" mode of operation. In a particular embodiment of the present invention, the forward switch 328 is adapted to sense the increased speed of the forward spindle, thus differentiating the "play" function from the "fast-forward" function of the cassette tape player. The forward switch 328 is adapted to sense the increased rotation speed of the forward spindle 334 by being responsive to a predetermined rotation speed of the spindle 334, and coupling this event to the power supply 312 or controller 306 of the NIC 300. The predetermined speed falls between the "play" spindle speed and the "fast-forward" spindle speed. As noted above, various sensor technologies know to those skilled in the art can be applied under the teachings of the present invention to detect the increased forward spindle speed above said predetermined speed threshold.

When the forward switch 328 couples the increased speed of the forward spindle 334 to the controller in the NIC 300, this event can be used in several different ways. In the case where more than one Bluetooth device is presently registered in the aforementioned wireless network, then the activation of the "fast-forward" function of the cassette tape player can be correlated to advancing to the next registered Bluetooth device. This is a logical correlation, since users are accustomed to using "fast-forward" to advance to the next audio track. Another embodiment of the present invention uses the "fast-forward" event to select from one of plural operational functions of the NIC 300 or Bluetooth network. Those skilled in the art are familiar with the various functions of the Bluetooth, or other, wireless network. The implementation of such function selection is a design choice in light of the teachings of the present invention. Once the "fast-forward" function is activated, it must be deactivated so that return to "play" mode, and reproduction of the selected audio content can continue. Of course, the user can press "fast-forward" and then immediately press "play" to revert to "play" mode. On some cassette tape players, the "fast-forward" actuator can be partially depressed and then released before it latches. This has the effect of momentarily increasing the speed of the forward spindle 334, thereby activating the forward switch 328. On cassette tape players that include an "auto-search" function, a different approach can be employed.

The "Auto-search" cassette tape player feature operates automatically upon pressing the "fast-forward" or "rewind" actuators on a cassette tape player. In the case of operation with a conventional magnetic tape cassette, the tape advances across the playback head 318 at an increased speed. The cassette tape player analyzes the signal coming from the tape head 318, looking for the blank space located between audio tracks. Once the blank space is located, the cassette tape player automatically reverts to the "play" mode of operation. The present invention advantageously utilizes the "auto-search" feature of such cassette tape players. In operation, the magnetic tape streaming past the tape head produces a tone signal, which is known to those skilled in the art. When the cassette tape player receives this tone, the player reverts from the "fast-forward" or "rewind" modes to the "play" mode. In the illustrative embodiment in FIG. 10, a tone generator 310 is coupled to the controller 306 and the audio circuits in the input/output board 308. The tone generator produces and audio toner that emulates the tone expected from the tape head 318 by the cassette tape player during "auto-search" mode of operation. When the user presses the "fast-forward" or "rewind" actuators, the tape speed increases, which is sensed by the forward switch 328 or the rewind switch 330, discussed more fully hereinafter. Upon receiving this sensor indication, the NIC 300 performs the predetermined function, as discussed above, and also generates a tone using tone generator 310, which is coupled to the magnetic coupling means 316. This action stimulates the "auto-search" feature of the cassette tape player, causing it to automatically revert to the play mode, and which subsequently causes the NIC 300 to return to the audio content reproduction mode, thereby closely correlating the tape to wireless functionality.

Another aspect of modern cassette tape players is the "auto-reverse" or bidirectional nature of operation. Older, and lower cost, cassette players require the user to remove the tape, flip it over, and reinsert the tape to play audio tracks located on "side 'B'", a concept well understood by those skilled in the art. More modern cassette tape players are capable of reversing direction and playing both "side 'A'" and "side 'B'" without physically repositioning the tape cassette. The teachings the present invention contemplate this reality by employing a second spindle switch, the reverse spindle switch, item 33 in FIG. 10. The reverse spindle switch includes a collar 336 that engages the reverse spindle 338 in the cassette tape player. The physical structure and operation of the reverse switch 330 can be the same as the forward switch 328 discussed herein before. The reverse switch 330 produces and indication both "play" mode" and "rewind" mode in the cassette tape player. In this way, the NIC 300 is capable of providing the aforementioned "play", "fast-forward", and "rewind" functionality on both unidirectional and auto-reverse cassette tape players, as will be appreciated by those skilled in the art.

Figure 11:
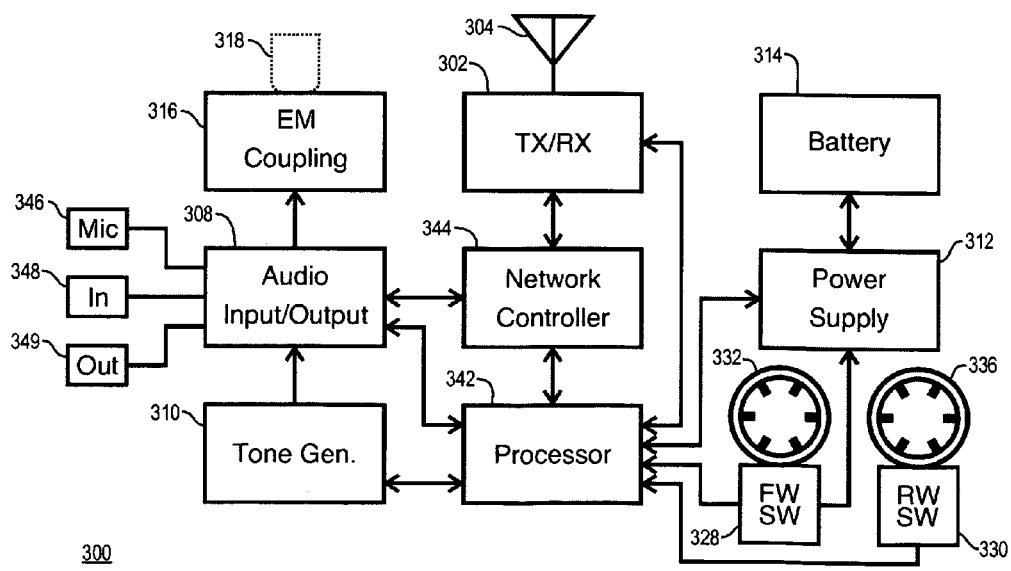
FIG. 11 is a functional block diagram of a network interface cassette adapter according to an illustrative embodiment of the present invention.

Reference is directed to FIG. 11, which is a functional block diagram of a network interface cassette adapter ("NIC") according to the illustrative embodiment of the present invention also describe in reference to FIG. 10. In FIG. 11, the NIC 300 interfaces to a cassette tape player via the player's tape head 318 and the forward and reverse tape drive spindles (not shown). At the wireless network end of the device, the interface is accomplished through an antenna 304, which couples electromagnetic energy with the network. The radio frequency signaling necessarily follows the protocol of the coupled WLAN in the illustrative embodiment. These signals include audio data and WLAN protocol data. A radio frequency transceiver 302 is coupled to the antenna 304. The transceiver 302 modulates and demodulates base band WLAN signals. In the illustrative embodiment both duplex and simplex communications paths are supported, thus, the transceiver 302 is either a duplex device or is multiplexed in time or code space. A network controller 344 is coupled to the transceiver 302. The network controller 344 couples digital audio signals from within the NIC 300 and organizes them into and out of base band WLAN signals. Essentially, the network controller 344 provides the protocol layering required for the given WLAN protocol. A digital signal processor is utilized in the illustrative embodiment, however any suitable computer device known to those skilled in the art could be employed for the network controller 344 function.

The network controller 344 is coupled to a processor 342 and audio input and output circuit 308. Together, these circuits provide the audio processor functions of the device, as well as the general microcontroller functions employed in typical dedicated control devices. The audio processor function encodes and decodes analog audio signals to and from digital audio signals, as well as managing audio path connections and signal levels. The processor 342 may be any suitable computing device know to those skilled in the art, and may even be the same physical device as the network controller 344. The distinction between network control and audio processing is primarily functional. The audio processor 342 couples analog audio signals and converts them into the digital domain, while the network controller 344 manages WLAN protocol and overhead functions. The audio input and output circuit 308 portion of the audio controller includes the microphone 346, the auxiliary input 348, and auxiliary output 349 connectors, in embodiments where these items are wired to the NIC 300. The audio input and output circuit 308 also couples analog audio signals to the electromagnetic coupling means 316, which converts these signals to magnetic signals for coupling with the tape head 318. The tone generator 310 is coupled to the processor 342 and outputs the generated tone to the audio circuits 308, which ultimately couple the generated tones to the electromagnetic coupling means 316. All of the audio circuits can be stereophonic or monaural, simplex or duplex as required for each application of the illustrative embodiment.

The functional block diagram in FIG. 11 also illustrates the spindle switch and power supply functions of the NIC 300. The power supply circuit 312 provides the required voltages and currents to the various components within the NIC 300. A storage battery 314 is the source of electrical power in the illustrative embodiment, and is coupled to the power supply 312. The forward switch 328 and forward spindle collar 332 are illustrated, and coupled to both the power supply 312 and the processor 342. In one embodiment, the forward switch 328 is a hard contact closure that couples battery 314 power to the power supply 312. In another embodiment, the forward switch 328 functions as a "soft" switch to the processor 342, which awakens the system from a power saving mode to begin operation. The soft switch mode is particularly useful in the embodiments where the shut-down timer is used, as it places power management under processor control. The forward switch 328 also couples the rewind speed indication to the processor 342, as described hereinbefore. The reverse, or "rewind" switch 330 and its spindle collar 336 are also illustrated in FIG. 11. In one illustrative embodiment, the rewind switch is coupled to the processor, as its function is limited to indication of rewind speed rotation of the reverse spindle. On the other hand, in cases where a auto-reverse cassette player is supported, then the rewind switch 330 will comprise the same components, connectivity, and functions as the forward switch 328, since the user may operate the cassette deck in either for forward or reverse play directions.

Figure 12:
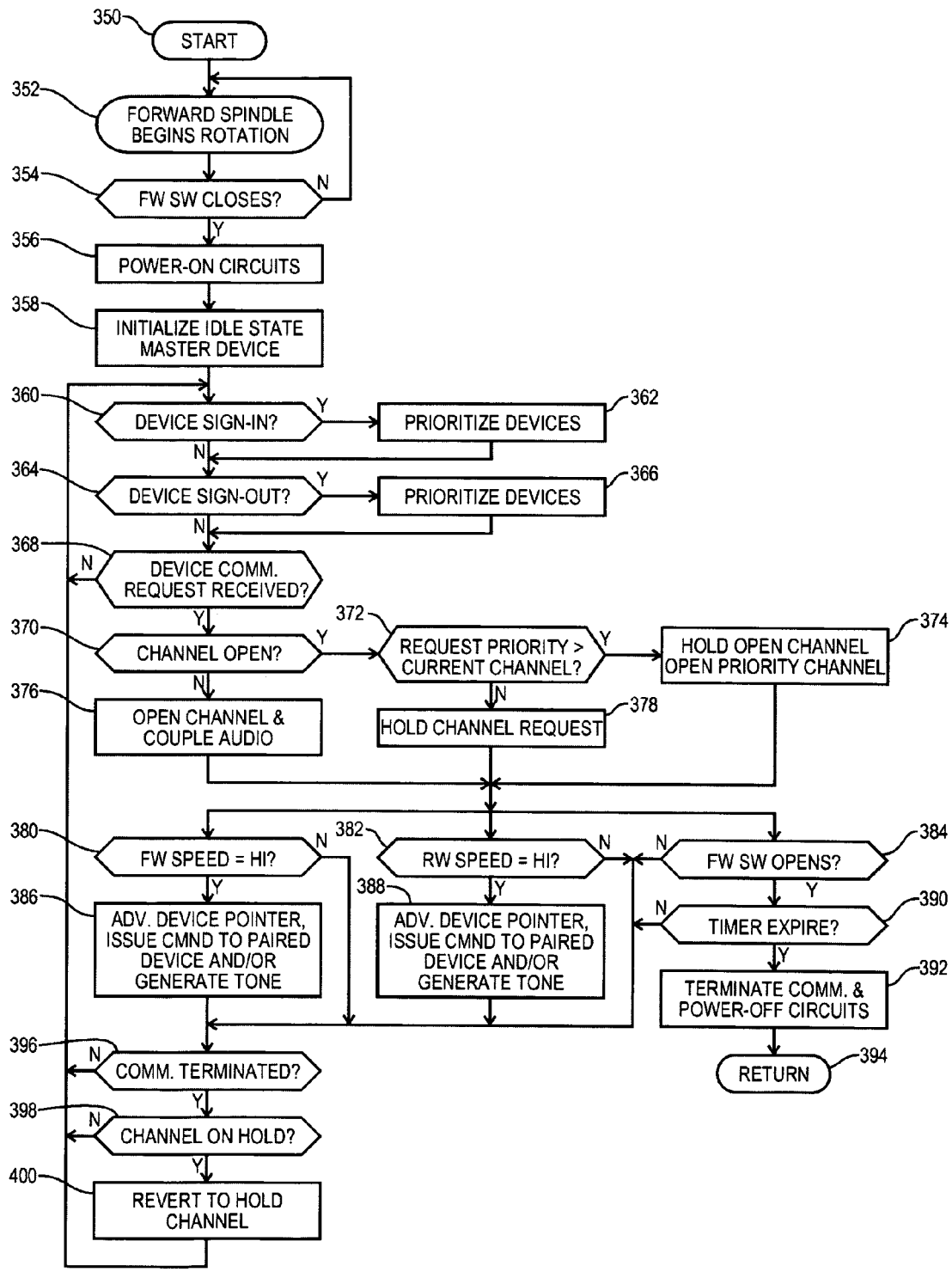
FIG. 12 is a process flow diagram according to an illustrative embodiment of the present invention.

Reference is directed to FIG. 12, which is a process flow diagram according to an illustrative embodiment of the present invention. The process illustrated in FIG. 11 involves the operation of the NIC as inserted into a cassette tape player, with subsequent audio content channel requests and prioritization, and including the spindle controlled power management and function selections. The process begins at step 350 and proceeds to step 352 where the forward spindle of the cassette tape player begins to rotate in response to the user's actuation of the play command. At step 354, the forward switch closes, which leads to step 356 where the power is turned on to all the circuits in the NIC. Note that this is true whether a hard contact power-on design is employed or a soft-switch processor based power management system is employed. In any case, once power is established, flow proceeds to step 358.

At step 358, the NIC initializes an idle state of operation, and establishes itself as a master device in the Bluetooth network. The idle state enables other device to establish communications with the NIC from time to time. At step 360, the main operating loop of the process is entered, and a test is made to determine if any other network devices have signed in. If another device has signed in, then the new device priority is checked and recorded at step 362. Device priorities are needed to establish resource allocation corresponding to the different priorities, and correlate to the priorities discussed respecting FIG. 9. Continuing now in FIG. 12, on the other hand, at step 360, if no new device has singed in, then flow proceeds to step 364, to test whether any device has signed out, or simply stopped communicating through the network. If a device has signed out at step 364, then flow proceeds to step 366, where the remaining devices still signed into the network are re-prioritized. On the other hand, at step 364, if no device has signed out, flow proceeds to step 368.

Step 368 in FIG. 12 is a test to determine if any of the devices currently signed into the network have made a communications request. Such a request occurs when one of the devices is attempting to transfer audio content to another device. Typical examples include an incoming telephone call, tuning in a DBS satellite station, playing a song through the MP3 player, and so forth. If no device has made a communications request at step 368, flow returns in loop fashion to step 360, where the aforementioned sing-in and sign-out tests are repeated. On the other hand, at step 368, if a device has made a communications request, then flow continues to step 370 to determine if there is an existing channel open. Since the cassette tape player can only reproduce one channel at a time, it is important to determine if the requesting device has a higher or lower priority prior to assigning a new terminal device for audio content reproduction. If there are two contending requests, the present invention uses a priority scheme to arbitrate the contention. At step 370, if there is a channel already open, then the requesting channel's priority is checked against the current channel at step 372. If the new request has an equal or lower priority, the current channel retains the resource and the new channel request is held at step 378, and flow proceeds to the spindle speed checking routine, discussed below. On the other hand, if the new channel request has a higher priority at step 372, then the current channel is held at step 254 and the new request is coupled as well. Flow proceeds to the spindle speed checking routine. To complete the flow from step 370, if no channel is open, then the new request is assigned a new channel and flow continues to the spindle speed checking routine. The priority test and call hold features of the present invention allow the user to enjoy lower priority services yet not miss higher priority services. The technique used is to hold a lower priority resource until the higher priority communications is completed, and then revert to the lower priority communications. The reversion action begins at step 396, which will be described hereinafter.

The spindle checking routines are processed every pass though the aforementioned main loop so that user activations in the cassette tape player are quickly and reliably recognized. The spindle speed routine consists of three tests in the illustrative embodiment, which are executed at steps 380, 382, and 384 in FIG. 12. This embodiment contemplates a single playback direction cassette tape player, however, those skilled in the art will appreciate the additional test needed for a automatic reversing cassette tape player. Step 380 tests to determine whether the forward switch is indicating high spindle speed, indicating the user has pressed the "fast-forward" actuator. If so, then flow proceeds to step 386, where the Bluetooth device pointer is incremented to the next sequential device number, advancing the audio source, or, the preprogrammed command change is implemented. Also at step 386, the tone generator is activated and outputs the "auto-search" tone to the tape head, which causes the tape player to automatically revert to the play mode. Flow then proceeds to step 396. The second test is conducted at step 382, which tests to determine whether the rewind switch is indicating high spindle speed, indicating the user has pressed the "rewind" actuator. If so, then flow proceeds to step 388, where the Bluetooth device pointer is decremented to the previous sequential device number, advancing the audio source, or, the preprogrammed command change is implemented. Also step 388, the tone generator is activated and outputs the "auto-search" tone to the tape head, which causes the tape player to automatically revert to the play mode. Flow then proceeds to step 396.

The third spindle speed test in FIG. 12 is conducted at step 384. This test checks to determine if the forward switch has opened, indicating that the forward spindle has stopped, and the play mode ceased. If so, then flow proceeds to step 390, where a brief timer runs to be sure the stopped spindle isn't a momentary state. If the timer does not expire, indicating the spindle has begun rotating again, then flow proceeds to step 396. On the other hand, at step 390, if the timer expires, then the user has stopped the cassette player and the systems terminates communications over the Bluetooth network and powers-off all the NIC circuit components. The process returns at step 394.

The aforementioned reversion actions begin at step 396 in FIG. 12. If the current communications channel has not been terminated, then flow returns to step 360, to repeat the aforementioned sequences, including prioritization of any new requests. On the other hand, at step 396, if a communications channel has been terminated, then a test is made at step 398 to determine if there is a communications request on hold. If not, flow returns to step 360. If there is a communications request on hold at step 398, then the channel reverts to the held request at step 400 before the process returns to the main loop.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for interfacing external signals to a cassette tape player having a tape head and a first tape transport spindle, comprising:
   an enclosure, conformed to the cassette tape form factor, containing;
   a circuit, for converting the external signals to audio signals;
   a coupling means, operable to convert said audio signals to magnetic audio signals, and aligned to couple said magnetic audio signals to the tape head, and
   a first sensor means operable to detect rotation of the first spindle and coupled to connect electric power to said circuit upon detecting rotation of the first spindle.

2. The apparatus of claim 1 wherein said first sensor means is further coupled to disconnect electric power from said circuit upon sensing cessation of rotation of the first spindle.

3. The apparatus of claim 2, further comprising:
   a timer coupled to said first sensor means, and operable to delay the time between sensing cessation of rotation of the first spindle and the disconnect of electric power.

4. The apparatus of claim 1 wherein said first sensor means is a centrifugal switch.

5. The apparatus of claim 1 wherein said first sensor means comprises a collar adapted to engage the first spindle and a switch coupled to detect movement of said collar.

6. The apparatus of claim 1 wherein said first sensor means is further operable to detect increased rotation speed of the first spindle.

7. The apparatus of claim 6 wherein said first sensor means is a centrifugal switch responsive to a predetermined rotation speed threshold.

8. The apparatus of claim 6 wherein said circuit performs plural functions, and wherein said circuit selects one of said plural functions in response to receipt of a detection of increased rotation speed signal from said first sensor means.

9. The apparatus of claim 6 wherein the apparatus is operable to couple signals between the cassette tape player and external signals from a wireless network, and wherein said circuit further comprises:
   a transceiver, operable to convert base band signals for radio frequency communications within the wireless network;

a controller, coupled to communicate the base band signals with said transceiver, and operable to convert audio signals to and from the base band signals, and wherein said controller operates to select from among plural functions in response to receipt of a detection of increased speed signal from said first sensor means.

10. The apparatus of claim 9 wherein said plural functions include selection of a particular external signal from amongst plural wireless devices communicating in the wireless network.

11. The apparatus of claim 9 wherein said plural functions include selection from among plural Bluetooth commands.

12. The apparatus of claim 1, wherein the cassette tape player includes a second tape transport spindle, further comprising:

a second sensor means operable to detector rotation of the second spindle.

13. The apparatus of claim 12 wherein said circuit performs plural functions, and wherein said circuit selects one of said plural functions in response to receipt of a detection signal from said second sensor means.

14. An apparatus for interfacing external signals to a cassette tape player having a tape head and a first tape transport spindle, comprising:

an enclosure, conformed to the cassette tape form factor, containing;

a circuit, for converting the external signals to audio signals;

a coupling means, operable to convert said audio signals to magnetic audio signals, and aligned to couple said magnetic audio signals to the tape head;

a first sensor means operable to detect rotation of the first spindle and further operable to detect increased rotation speed of the first spindle, and a signal generator coupled to output a control signal to the tape head in response to receipt of a detection of increased speed signal from said first sensor means.

15. The apparatus of claim 14 wherein said control signal emulates a "blank space" signal, such as produced between sounds tracks where the tape of an audio cassette passes rapidly across the tape head in auto-search capable cassette players.

16. A method for interfacing external signals to tape head in a cassette tape player having a first tape transport spindle using circuitry disposed within an enclosure conforming to the cassette tape form factor, comprising the steps of:

upon detecting rotation of the first spindle:
converting the external signals to audio signals;
converting the audio signals to magnetic audio signals;
coupling the magnetic audio signals to the tape head, and
coupling electric power to the circuitry upon detecting rotation of the first spindle.

17. The method of claim 16 further comprising the step of disconnecting electric power from the circuitry upon sensing cessation of rotation of the first spindle.

18. The method of claim 17, further comprising the step of delaying said disconnecting step.

19. The method of claim 16 wherein said detecting step is accomplished centrifugally.

20. The method of claim 16 further comprising the step of detecting increased rotation speed of the first spindle.

21. The method of claim 20 wherein said detecting increased rotation speed is accomplished using a centrifugal switch activated at a predetermined rotation speed threshold.

22. The method of claim 20 wherein the circuitry performs plural functions, further comprising the step of selecting one of said plural functions in response to detecting increased rotation speed of the first spindle.

23. A method for interfacing external signals to tape head in a cassette tape player having a first tape transport spindle using circuitry disposed within an enclosure conforming to the cassette tape form factor, comprising the steps of:

upon detecting rotation of the first spindle:
converting the external signals to audio signals;
converting the audio signals to magnetic audio signals;
coupling the magnetic audio signals to the tape head;
detecting increased rotation speed of the first spindle, and
generating a control signal to the tape head in response to detecting increased rotation speed of the first spindle.

24. The method of claim 23 wherein the control signal emulates a "blank space" signal, such as produced between sounds tracks where the tape of an audio cassette passes rapidly across the tape head in auto-search capable cassette players.

25. The method of claim 20 wherein the circuitry includes a transceiver and a controller and is operable to couple signals with the cassette tape player, and wherein the external signals communicate with a wireless network; further comprising the steps of:

converting base band signals to external signals for radio frequency communications within the wireless network;

communicating the base band signals with said transceiver, and converting audio signals to and from the base band signals, and selecting from among plural functions in response to said detecting increased rotation speed of the first spindle step.

26. The method of claim 25 wherein the plural functions include selection of a particular external signal from amongst plural wireless devices communicating in the wireless network.

27. The method of claim 25 wherein the plural functions include selection from among plural Bluetooth commands.

28. The method of claim 16, wherein the cassette tape player includes a second tape transport spindle, further comprising the step of detecting rotation of the second spindle.

29. The method of claim 28 wherein the circuitry performs plural functions, further comprising the step of selecting one of the plural functions in response to said detecting rotation of the second spindle step.

* * * * *

UNITED STATES PATENT AND TRADEMARK OFFICE
CERTIFICATE OF CORRECTION

PATENT NO. : 7,120,463 B2
APPLICATION NO. : 11/050286
DATED : October 10, 2006
INVENTOR(S) : David K. Mathews Page 1 of 1

It is certified that error appears in the above-identified patent and that said Letters Patent is hereby corrected as shown below:

On the title page, after the filing data, insert the following:

-- Related U.S. Application Data --
-- Continuation-in-part of application No. 10/858,538, filed on Jun. 1, 2004. --

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,120,463 B2 | Page 1 of 1 |
| APPLICATION NO. | : 11/050286 | |
| DATED | : October 10, 2006 | |
| INVENTOR(S) | : David K. Mathews | |

It is certified that error appears in the above-identified patent and that said Letters Patent is hereby corrected as shown below:

On the title page, after the filing date, insert the following item [63]:

-- Related U. S. Application Data --
-- Continuation-in-part of application No. 10/858,538, filed on Jun. 1, 2004. --

Signed and Sealed this

Twentieth Day of January, 2009

JON W. DUDAS
*Director of the United States Patent and Trademark Office*